United States Patent [19]

Burke

[11] Patent Number: 5,795,001
[45] Date of Patent: Aug. 18, 1998

[54] VACUUM DEVICE FOR HANDLING ARTICLES

[76] Inventor: Stephen H. Burke, 5801 Turnberry Ct., Commerce Township, Oakland County, Mich. 48382

[21] Appl. No.: 769,048

[22] Filed: Dec. 18, 1996

[51] Int. Cl.⁶ .................. B25J 15/06; B66C 1/02
[52] U.S. Cl. ........................ 294/64.1; 294/907
[58] Field of Search ................. 294/64.1, 64.2, 294/64.3, 907; 29/743; 116/70; 271/90

[56] References Cited

U.S. PATENT DOCUMENTS

| | | | |
|---|---|---|---|
| 5,184,858 | 2/1993 | Arai | 294/64.1 |
| 5,188,411 | 2/1993 | Golden | 294/64.2 |
| 5,217,273 | 6/1993 | Hendricsen et al. | 294/64.1 |
| 5,290,082 | 3/1994 | Palme et al. | 294/64.1 |
| 5,374,090 | 12/1994 | Goff | 29/743 |

*Primary Examiner*—Dean Kramer
*Attorney, Agent, or Firm*—Rader, Fishman & Grauer PLLC

[57] ABSTRACT

A hand held device for manipulating articles having a generally vacuum sustaining face surface. The hand held device includes a suction cup having generally pliable side walls and a hand held portion attached to the suction cup. In a first embodiment the hand held portion includes an electric motor coupled to a vacuum pump. An electronic circuit within the hand held portion allows the operator to directly control the application of vacuum to the suction pump. Also, an electronic circuit senses the vacuum sustained between the suction cup and the article being manipulated and if that vacuum falls below a predetermined level the electronic circuit warns the operator of the condition and automatically actuates the motor until an exceptable vacuum level is reestablished. Alternative embodiments of the present invention include embodiments which utilize a venturi pump or a hand actuated pump which can directly replace the electric motor vacuum generation module. Thus, the present invention not only offers an improvement over the prior art with its automated sensing and actuation circuit but offers a modular approach to configuring the vacuum generator from at least three vacuum different sources.

14 Claims, 3 Drawing Sheets

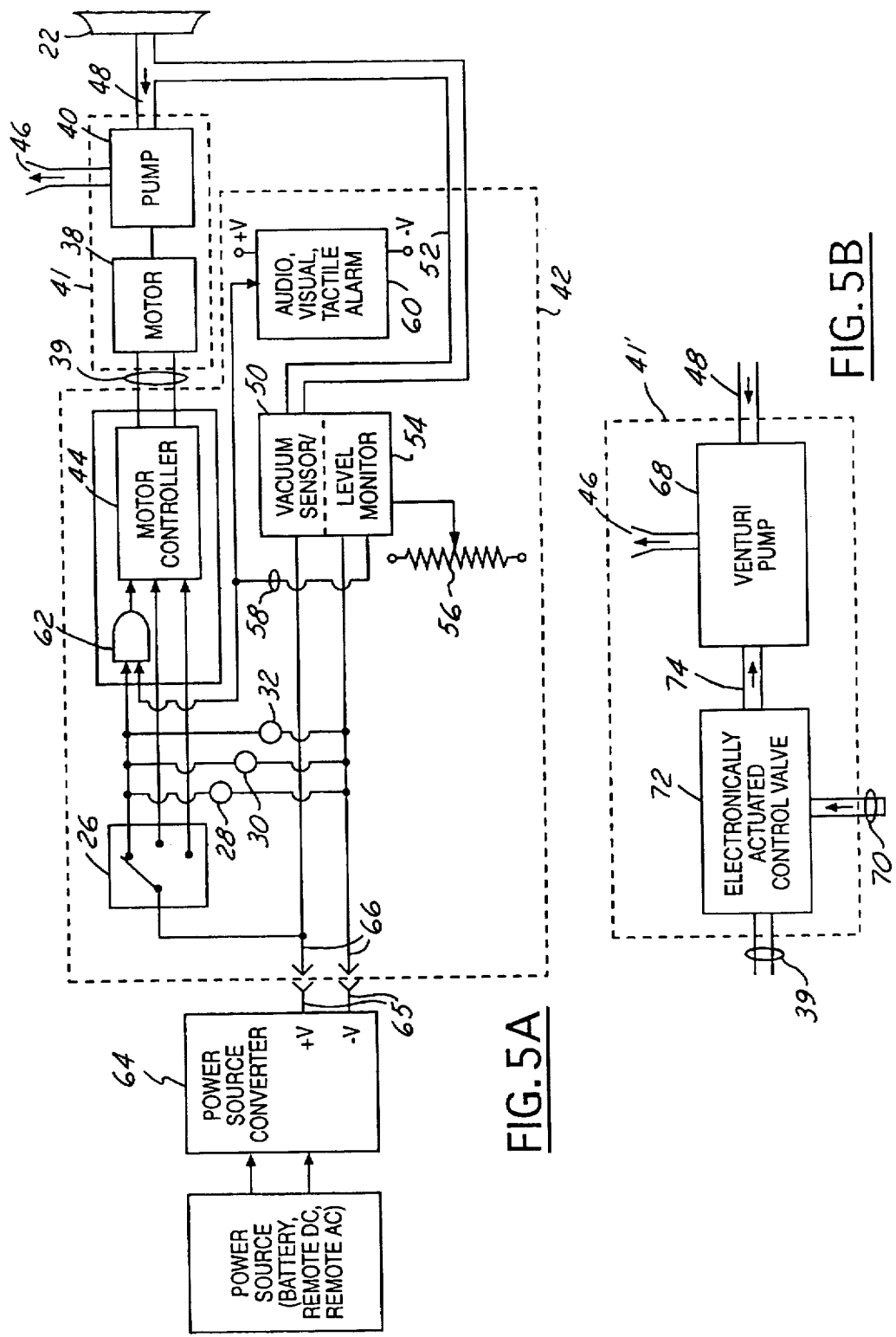

VACUUM DEVICE FOR HANDLING ARTICLES

TECHNICAL FIELD

This application relates to devices for handling items and relates more particularly to devices which employ a vacuum for attaching themselves to the surface of an article to be manipulated.

BACKGROUND OF THE INVENTION

Often times, heavy or cumbersome objects cannot be easily manually manipulated. For example, large sections of plate glass are often heavy and otherwise very cumbersome to manipulate. Thus, an installer of such plate glass often uses a vacuum device which assists in the handling of plate glass.

One such device is set forth in U.S. Pat. No. 3,240,525 issued to H. L. Wood on Mar. 15, 1966. This device can generally be described as a vacuum device having a suction cup portion and a handle portion attached to the suction cup portion. The suction cup portion is adapted to engage a relatively flat surface of an article to be manipulated (such as a flat side of a plate glass window) and the handle portion incorporates a manually manipulated hand pump. As the operator actuates the hand pump by alternatively depressing and releasing the pump plunger, the pump evacuates the air from the chamber created between the suction cup and the plate glass. Once a sufficient vacuum has been drawn, the vacuum device adheres to the plate glass with sufficient strength such that the plate glass can be easily manipulated by simply manipulating the handle of the vacuum device.

U.S. Pat. No. 5,184,858 discloses an improvement to the Wood device in that a sensor is incorporated into the handle portion which senses the degree of vacuum existing between the suction cup and the planar surface of the device being manipulated. Once this vacuum decreases below a predetermined limit, an audible warning sensor is activated thereby warning the user that a marginal vacuum condition exists. When this occurs, the user has the option of "pumping up" the vacuum to a safe range or setting the plate glass article down to determine if an obstruction is present (or other similar condition) which is causing a vacuum leak.

U.S. Pat. No. 5,106,139 discloses a hand held pick up device for picking up light weight items such as integrated circuits, etc. The device set forth in U.S. Pat. No. 5,106,139 employs a manually actuated vacuum pump to generate the vacuum condition.

U.S. Pat. No. 5,217,273 is directed to a portable handling tool for handling electronic work pieces. This tool is designed to carry lightweight work pieces (such as semi-conductor wafers) and includes a battery powered portable vacuum pump remote from the handle of the hand tool.

Although the above referenced devices appear operable for there intended purpose, they are not without their drawbacks. For example, the devices set forth in U.S. Pat. Nos. 3,240,525; 5,184,858; and 5,106,139 must be manually activated which, may be inconvenient in some applications. Also, U.S. Pat. No. 5,217,273 although it uses an electronic means to create a vacuum, this electronic means must be manually activated and no provision is set forth therein to automatically activate the vacuum under low vacuum conditions. Also, the device set forth therein is compact or portable and accordingly it is not suited for manipulating large, cumbersome articles (in remote locations) such as plate glass, sheet steel, or the like.

SUMMARY OF THE INVENTION

The present invention comprises a hand held device for manipulating articles having a generally vacuum sustaining face. The device includes a suction cup having pliable sidewalls and a handle portion attached to the suction cup. The handle portion includes an outer housing which encloses an electric motor and a pump which is mechanically coupled to the electric motor. The pump is connected to the suction cup by way of a channel wherein the electric motor is adapted to actuate the pump causing the pump to evacuate air from a space defined between the suction cup and a surface of said generally vacuum sustaining face of said article.

Preferably the device of the present invention includes a bi-directional motor which is adapted to rotate in either a first direction or a second direction. A switch is connected to the motor which allows the operator to control the direction of motor rotation and also allows the operator to turn the motor on and off.

Preferably the present invention includes a vacuum sensor which is coupled to the channel for sensing a vacuum within the channel. In a preferred embodiment, a vacuum monitor is coupled to the vacuum sensor for monitoring the vacuum level. Whenever the vacuum level in the channel drops below a predetermined level the monitor initiates an audible, visual, or tactile alarm indicating to the user that the vacuum level has dropped below the predetermined amount. Also, the same signal is routed to the motor and automatically activates the motor to thereby power the pump to increase the vacuum level.

BRIEF DESCRIPTION OF THE DRAWINGS

FIG. 5A is a schematic of the components connection of the hand held device of FIG. 1.

FIG. 5B is an alternative embodiment of the vacuum generation module of FIG. 5A.

DETAILED DESCRIPTION OF THE PREFERRED EMBODIMENTS

Figure 1:
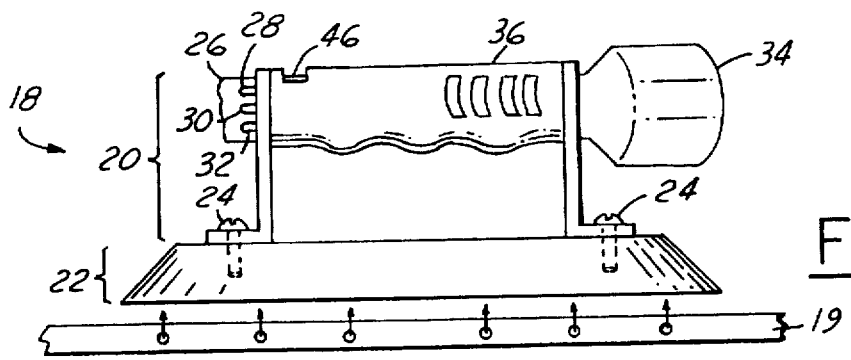
FIG. 1 is a side plan view of a first embodiment of the hand held device of the present invention showing NI-CAD battery pack.
Figure 2:
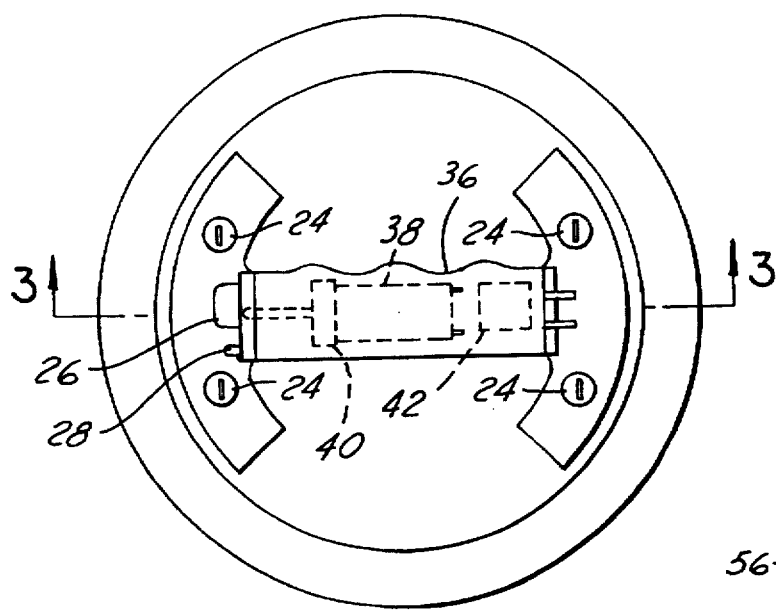
FIG. 2 is a top view of the device of FIG. 1, (NI-CAD battery pack not shown).
Figure 4:
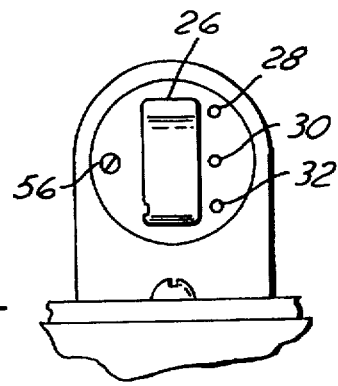
FIG. 4 is a left side elevational view taken substantially along line 4 of FIG. 3 (NI-CAD battery pack not shown).
Figure 3:
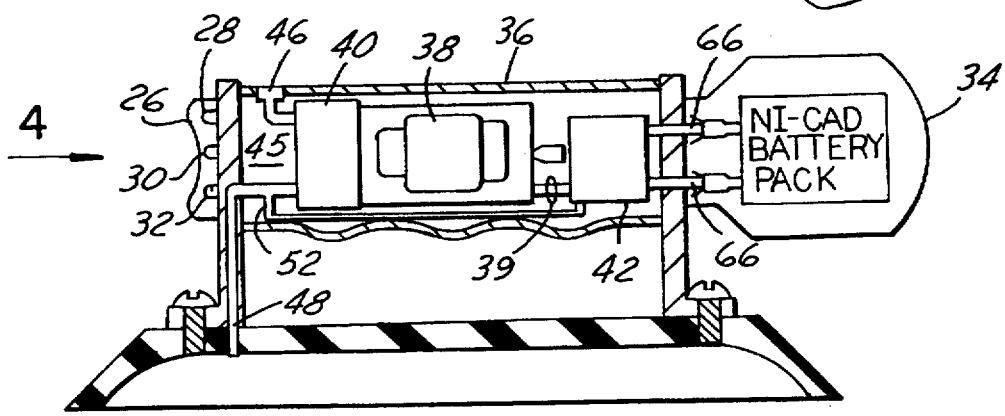
FIG. 3 is a cross sectional view take substantially along lines 3—3 of FIG. 2.

Now referring to FIG. 1, hand held device 18, of the present invention includes hand held portion 20 and suction cup portion 22. Handle portion 20 is fastened to suction cup portion 22 by way of fasteners 24. Handle portion 20 includes control switch 26, mode indicating lights 28 through 32, NI-CAD battery pack 34, and handle grip portion 36.

Handle grip portion 36 is generally cylindrical and is designed to conform to the grip of the users hand. Handle 36 is generally hollow defining a center cavity 45 and within cavity 45 is enclosed electric motor 38, pump 40, and control circuit 42. The operation of the device set forth FIGS. 1 through 5A will now be explained.

When an operator desires to attach hand held device 18 to an article 19, device 18 is held in close proximity to article 19 and control switch 26 is moved to the upward position. When switch 26 is placed in this position, lamp 28 illuminates and also motor controller 44 is directed to activate motor 38 in a forward rotational direction. This causes pump 40 to evacuate the air from the space defined between a vacuum sustaining of article 19 and suction cup 22. This evacuation causes atmospheric pressure to push device 18 towards article 19 and thereby causes device 18 and article 19 to "adhere" by way of atmospheric pressure. When sufficient vacuum force has been created to "adhere" article 19 to device 18, the operator manipulates switch 26 downward into the neutral, middle position. In this position lamp 30 is illuminated indicating that device 18 is in a hold position. In this hold (on off) mode, motor controller does not initiate any signal to motor 38 thereby maintaining pump 40 in a non-rotating mode of operation. In this mode, the vacuum is maintained between hand held device 18 and article 19 by way of a check valve located within pump 40 (check valve not shown).

Once article 19 has been maneuvered into position and hand held device 18 is no longer needed, the operator manipulates switch 26 downward. This position causes light 32 to illuminate indicating that the release mode of operation has been activated. In this mode of operation, motor controller 44 activates motor 38 in a reverse rotational direction such that pump 40 draws in air from atmospheric vent 46 and pressurizes channel 48. Channel 48 is connected to suction cup portion 22. Thus when pump 40 pressurizes channel 48 it also pressurizes the void between suction cup portion 22 and article 19. This pressurization causes device 18 to immediately release its grip from article 19.

An important aspect of the present invention is the incorporation of vacuum sensor 50. Vacuum sensor 50 is connected to channel 48 by way of channel 52. By virtue of this connection, vacuum sensor 50 can sense the vacuum present between article 19 and device 18. Vacuum sensor 50 is electronically coupled to level monitor circuit 54. Level monitor circuit 54 continually monitors the electronic signal generated by vacuum sensor 50 and compares it with the predetermined level established by set control 56. Whenever the output signal generated by vacuum sensor 50 falls below the signal level generated by set control 50, level monitor circuit 50 outputs an electronic signal on output line 58. This signal flows to both alarm generator 60 and OR gate 62. Alarm generator 60 generates any one of an audio, visual, or tactile alarm indicating to the user that the vacuum level present between suction cup 22 and article 19 has dropped below the predetermined limit. The signal sent from level monitor circuit 54 to OR gate 62, automatically activates motor controller in the vacuum mode. This causes motor 38 to rotate in a way which activates pump 40 to create a vacuum within channel 48. Once the vacuum created within channel 48 is sufficiently strong, level monitor 54 ceases to generate an output signal long 58 thereby turning off motor controller 44.

In a preferred embodiment, it is contemplated that vacuum sensor 50 and level monitor 54 are constructed from standard analog circuits. For example, vacuum sensor 50 can be comprised of any number of well known, inexpensive vacuum sensors which generate and analog output voltage having an amplitude proportional to the sensed vacuum.

Also, it is contemplated that level monitor 54 be comprised of a simple analog comparitor circuit (including hysteresis feedback) for comparing the input signal level from set control 56 to the output of vacuum sensor 50 (output of vacuum sensor 50 not shown). The resulting output voltage of this comparitor circuit would be present on output line 58 of course discrete digital circuits and/or a microprocessor could be used in place of some or all of the above referenced analog circuits and such a digital approach is well known to those skilled in the art.

Figure 6:
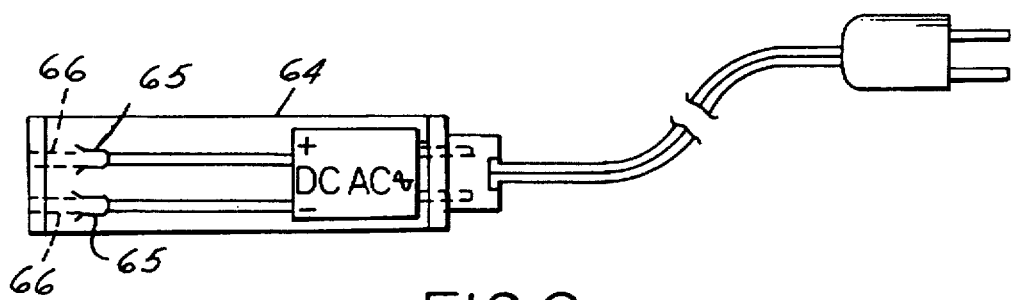
FIG. 6 is a diagramatic drawing of the AC to DC converter of the present invention.

In a second embodiment of the design of the present invention, FIG. 6 discloses an AC to DC converter which is effective for converting AC line current to a DC current which is directly useable by control circuit 42. It is contemplated that in a preferred embodiment, AC to DC converter 64 takes the place of NI-CAD battery pack 34. Thus, when AC to DC converter 64 is used, its female prongs 65 are plugged into the male prongs 66 of control circuit 32.

Figure 7:
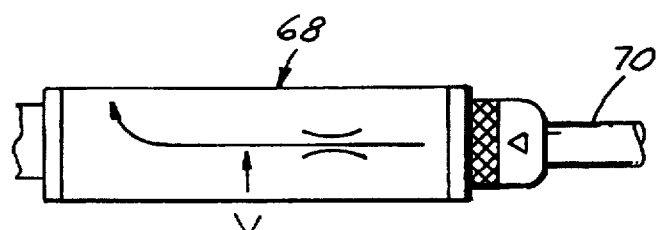
FIG. 7 is a diagramatic drawing of a Venturi pump implemented in the embodiment set forth in FIG. 5B.

It is apparent that the device of the present invention lends itself to a modular approach. More specifically, although the embodiments disclosed hereto for disclose an electric motor 38 to power rotary pump 40 it is contemplated that other "vacuum sources" could be easily interchanged with vacuum generation module 41. For example, FIG. 5B and 7 disclose an embodiment wherein venturi pump 68 is attached to a source of compressed air 70. Such vacuum pumps that operate from compressed air well known to those skilled in the art and such a pump can be easily used to draw a vacuum from channel 48. In an application where a venturi pump is used, control 42 could still be used as it is shown and described except that motor controller 44 would interface with the second embodiment 41', of the vacuum generation module 41 (41' shown in FIG. 5B). In this embodiment drive conductors 39 interface with electronically actuated control valve 72. When a signal is present on conductors 39, electronically actuated control valve 72 is opened and pressurized air flows through source 70, valve 72, channel 74, venturi pump 68, and is vented to atmosphere through vent 46. This pressurized airflow allows Venturi pump 68 sufficient airflow to generate a vacuum within channel 48.

Figure 8:
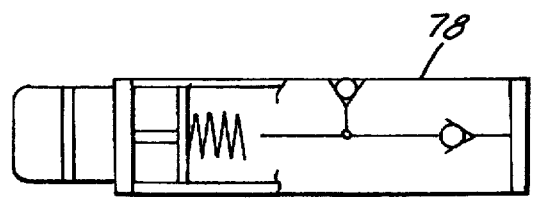
FIG. 8 is a hand actuated vacuum pump.

It is also contemplated, in the accordance with the embodiment of FIG. 8, that a conventional hand actuated pump 78 can be used as the vacuum generation module 41.

Figure 9:
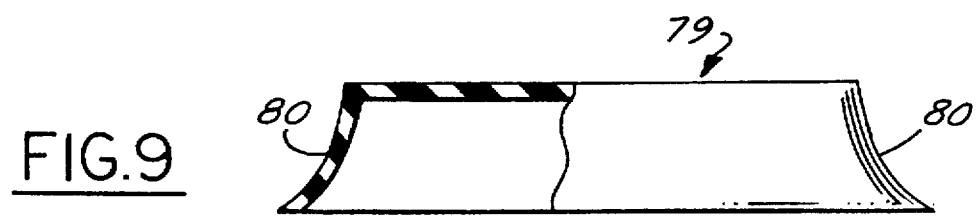
FIGS. 9 and 10 depict alternative embodiments of the suction cup element of the present invention.
Figure 10:
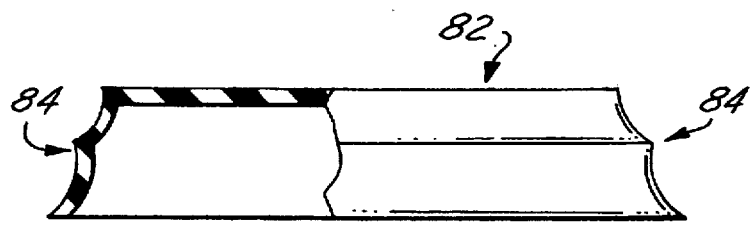

Also, in line with this modular approach, various embodiments of suction cup 22 can be used such as those shown in FIGS. 9 and 10. For example, the suction cup embodiment of FIG. 9 includes relatively stiff side walls 80 which enable suction cup 79 to be used on applications where plate like article 19 is extremely heavy. Suction cup 82 discloses a suction cup embodiment having generally accordion shaped sides 84. This embodiment is well suited for applications where article 19 has some degree of irregularity to its surface and does not lend itself to being manipulated by suction cup 79 because of the relative inflexibility of its side walls 80. Accordion sides 84 of suction cup 82 are made from a more pliable material than that of 79 and also the accordion geometry promotes some degree of flexing.

In view of the above, it is clear that in addition to the electronic version of the hand held device of the present invention set forth in FIGS. 1 through 5A, the device of the present invention easily lends itself to the modular approach wherein various vacuum generation modules 41, 41', and 78 and various suction cups 79, 82 can be used. This modular approach allows the device of the present invention to be almost completely universal in its use and is suitable for a vast array of applications regardless of the weight of article 19 or its surface geometry.

It is contemplated that motor controller 44 is a standard DC motor controller well known to those skilled in the art of DC motor control. Thus, further elaboration on its design is unnecessary. Also, it is envisioned that alarm generator 60 is comprised of any number of readily available audio alarms (such as buzzers etc., visual alarms such as lights or LCD readout devices, or tactile alarms such as any device which vibrates or otherwise sends a tactile signal through grip portion 36 of device 18). It is also contemplated that device 18 of the present invention is well suited for use with any article which has a surface which will sustain a vacuum. Thus, although it is contemplated that handling articles such as plate glass, sheet steel, and the like is easily accomplished by device 18, it is also contemplated that articles such as curved glass, and other devices having non-planar surfaces can also be easily be handled by device 18. Also, device 18 is well suited for handling articles which may present some vacuum loss such as semi-porous materials or articles having irregular surface geometries. Such articles can be easily handled by device 18 provided that the rate at which vacuum is lost is less than the rate at which vacuum pump 40 can recover.

The forgoing detailed description shows that the preferred embodiments of the present invention are well suited to fulfill the objects of the invention. It is recognized that those skilled in the art may make various modifications or additions to the preferred embodiments chosen here to illustrate the present invention without departing from the spirit of the present invention. Accordingly, it is to be understood that the subject matter sought to be afforded hereby should be deemed to extend to the subject matter defined in the appended claims, including all fair equivalence thereof.

I claim:

1. A hand held device for manipulating articles having a generally vacuum sustaining face, comprising:
   a suction cup having pliable side walls,
   a handle portion attached to said suction cup, said handle including an electric motor and a pump mechanically coupled to said motor, wherein said pump is connected to said suction cup by way of a channel, whereby said electric motor is adapted to activate said pump causing said pump to evacuate air from a space defined between the suction cup and a surface of said generally vacuum sustaining face of said article, wherein said motor is a bi-directional motor and includes a motor shaft which rotates about an axis, wherein said shaft is mechanically coupled to said pump and wherein said bi-directional motor includes a switch adapted to direct said bi-directional motor to rotate said motor shaft in a first direction about said axis and wherein said switch is adapted to direct said bi-directional motor to rotate said motor shaft in a second direction.

2. The device of claim 1, further including a vacuum sensor coupled to said channel for sensing the vacuum within said channel.

3. The device of claim 2, further including a monitoring means coupled to said vacuum sensor for monitoring the vacuum sensed by said sensor and means coupled to said monitoring means for initiating at least one of an audible, visual, or tactile alarm signal when said monitoring means detects that said vacuum sensed by said vacuum sensor falls below a predetermined limit.

4. The device of claim 2, further including monitoring means coupled to said vacuum sensor for monitoring an output signal generated by said sensor indicative of the vacuum sensed by said vacuum sensor and for actuating said motor when said output signal falls below a predetermined limit.

5. The device of claim 1, wherein said electric motor is a direct current motor.

6. The device of claim 5, further including a battery coupled to said motor.

7. A hand held device for manipulating articles having a generally vacuum sustaining face, comprising:
   a suction cup,
   a handle portion attached to said suction cup, said handle having a center cavity
   an electric motor and a pump located within said center cavity wherein said pump is mechanically coupled to said motor, and wherein said pump is connected to said suction cup by way of a channel, whereby said electric motor is adapted to drive said pump causing said pump to evacuate air from a space defined between the suction cup and a surface of said generally vacuum sustaining face of said article, wherein said motor is a bi-directional motor and includes a motor shaft which rotates about an axis, wherein said shaft is mechanically coupled to said pump and wherein said bi-directional motor includes a switch adapted to direct said bi-directional motor to rotate said motor shaft in a first direction about said axis and wherein said switch is adapted to direct said bi-directional motor to rotate said motor shaft in a second direction.

8. The device of claim 7, further including a vacuum sensor coupled to said channel for sensing the vacuum within said channel.

9. The device of claim 8, further including a monitoring means coupled to said vacuum sensor for monitoring the vacuum sensed by said sensor and means coupled to said monitoring means for initiating at least one of an audible, visual, or tactile alarm signal when said monitoring means detects that said vacuum sensed by said vacuum sensor has fallen below a predetermined limit.

10. The device or claim 8, further including monitoring means coupled to said vacuum sensor for monitoring an output signal generated by said sensor indicative of the vacuum sensed by said vacuum sensor and for activating said motor when said output signal falls below a predetermined limit.

11. The device of claim 7, wherein said electric motor is a direct current motor.

12. The device of claim 11, further including a battery electrically coupled to said motor.

13. The device of claim 11, further including an AC to DC charging device electrically coupled to said motor.

14. The device of claim 7, wherein said motor further includes a motor controller.

\* \* \* \* \*